United States Patent [19]

Sugai

[11] Patent Number: 5,802,259
[45] Date of Patent: Sep. 1, 1998

[54] DATA PROCESSING DEVICE FOR PROCESSING PRINT DATA

[75] Inventor: Toshimi Sugai, Kawasaki, Japan

[73] Assignee: Fujitsu Limited, Kawasaki, Japan

[21] Appl. No.: 258,229

[22] Filed: Jun. 10, 1994

[30] Foreign Application Priority Data

Jul. 29, 1993 [JP] Japan .................. 5-187892

[51] Int. Cl.$^6$ .................................. H04N 1/23
[52] U.S. Cl. ............................ 395/112; 395/101
[58] Field of Search ...................... 395/112, 111, 395/117, 109, 114, 101, 107, 115, 113, 526, 116; 358/296

[56] References Cited

U.S. PATENT DOCUMENTS

| | | | |
|---|---|---|---|
| 5,050,101 | 9/1991 | Kiuchi et al. | 395/117 |
| 5,129,053 | 7/1992 | Makihara | 395/117 |
| 5,243,691 | 9/1993 | Kawabara et al. | 395/112 |
| 5,249,060 | 9/1993 | Ishikawa et al. | 358/296 |
| 5,268,993 | 12/1993 | Ikenoue et al. | 395/114 |
| 5,276,458 | 1/1994 | Sawdon | 395/112 |
| 5,291,561 | 3/1994 | Tanaka e al. | 395/117 |
| 5,299,295 | 3/1994 | Kim et al. | 395/111 |
| 5,335,315 | 8/1994 | Yoshida et al. | 395/109 |

FOREIGN PATENT DOCUMENTS

| | | |
|---|---|---|
| 253 627 | 1/1988 | European Pat. Off. . |
| 55-126472 | 9/1955 | Japan . |
| 64-61788 | 3/1964 | Japan . |
| 63-198122 | 8/1988 | Japan . |
| 3-247475 | 11/1991 | Japan . |
| 4-664 | 1/1992 | Japan . |

*Primary Examiner*—Raymond J. Bayerl
*Assistant Examiner*—Steven P. Sax
*Attorney, Agent, or Firm*—Staas & Halsey

[57] ABSTRACT

A data processing device processes print data based on print information to quickly provide a printing form desired by a user. The device comprises first converting means for converting a command form of a hard control command for a printer to a command form for a display wherein the hard control command is defined corresponding to the print data. Second converting means converts a coordinate of the print data to the coordinate for the display according to the print control information assigned in the print data to load the print data into a print data memory. Display control means sends out the print data loaded into the print data memory with the hard control command converted by the first converting means and displays the print data to a display screen of a display with a display form corresponding to a print form.

7 Claims, 8 Drawing Sheets

DATA PROCESSING DEVICE FOR PROCESSING PRINT DATA

BACKGROUND OF THE INVENTION

1. Field of the Invention

The present invention relates to a data processing device for processing print data and, more particularly, to a data processing device for processing print data which can quickly provide a printing form desired by a user.

2. Description of the Background Art

In general, a data processing device for processing print data is connected to a display and a printer. When a data processing device for print data prints out print data, the data processing device for processing print data executes the following processes.

The data processing device generates a display to display print data which is produced by an application program on a display screen. When a user inputs a command for printing-out, the data processing device downloads the print data to the printer. The printer prints out the print data. In detail, the data processing device downloads the print data and the printing control information of the print data to the printer. And the printer prints out the print data according to the printing control information which is downloaded by the data processing device. This printing control information includes character size, character spacing, line spacing, and an array table.

Moreover, when the data processing device displays print data which is produced by an application program, the data processing device downloads the print data and the display control information of the print data to the display. The display displays the print data which is downloaded on a display screen according to the display control information. This display control information includes character size, line spacing, and character spacing. This display control information is previously set for the display screen, without taking printing control information for use in printing out the print data into consideration.

Therefore, the data processing device manages the two types of control information, which includes printing control information and display control information.

In the case when the forms overlay definition data (this data is the fixed data part in a printed matter, e.g., a fixed document form) for printing-out is previously produced, the data processing device downloads the forms overlay definition data to the printer. The forms overlay definition data is indicative of a fixed document form into which the print data is inserted to generate a complete document form. After downloading the forms overlay definition data, the data processing device downloads the print data to the printer. And the printer overlays the forms overlay definition data with the print data. The printer then prints out the overlaying data.

Moreover, even if the data processing device has the forms overlay definition data for printing, the data processing device has forms overlay definition data for displaying because of a difference between resolution of the printer and resolution of the display. The display forms overlay definition data are used for being overlayed with print data to be displayed to the display.

Because the display control information and the printing control information are not correlated to each other, the forms of displayed data differ from the forms of printed-out data. Therefore, when the user refers to the forms of data which are to be displayed on a display screen, the user can not recognize the forms of data which will be printed out. Consequently, there is a problem that the user must repeat, by trial and error, to set the printing control information and must continue to print out for a test, until the desired printing form is obtained.

Further, because the above mentioned data processing device directly downloads the forms overlay definition data previously produced to the printer, it is possible to produce a misregistration between the forms overlay definition data and the print data separately produced. To avoid having the misregistration occur, the conventional printer comprises a digital switch mechanism which adjusts the position between the forms overlay definition data and the print data, so that the user operates the digital switch mechanism to avoid the misregistration between the forms overlay definition data and the print data. However, the user must detect the misregistration value between the forms overlay definition data and the print data by a trial printing, to provide the misregistration value to the digital switch mechanism. Besides, to correctly adjust the misregistration, the user must generally perform the trial printing repeatedly.

Because the forms overlay definition data to be downloaded to the printer and the display forms overlay definition data are separately controlled, there is a waste which occurs because of the dual control required. Further, another problem is that the printer forms overlay definition data and the forms overlay definition data do not match each other.

As mentioned above, the conventional data processing device has a problem in that the user must do at least one trial printing to recognize the printing form of the print result, and in some cases, the user must do trial printing repeatedly. Therefore, the user must consume time in obtaining the desired printing.

SUMMARY OF THE INVENTION

It is therefore an object of the present invention to provide a data processing device for processing print data based on printing information which can quickly provide a printing form desired by a user.

Other objects of the present invention will become clear as the description proceeds.

The data processing device for processing print data of the present invention is connected to a printer and a display. Moreover, the display is connected to an interactive unit such as a keyboard. The printer prints out the data which is processed by the data processing device and the display displays the data which is produced by the data processing device. Also, the interactive unit inputs input data designated by the user.

The data processing device comprises a print data filing unit, a printing control information filing unit, an overlay filing unit, printing control means, first converting means, second converting means, third converting means, a print data memory, an overlay memory, display control means, and modification means.

The print data filing unit stores print data to be printed. The printing control information filing unit stores printing control information designating a printing form of the print data. The overlay filing unit controls definition data indicative of the fixed data in a printed matter, e.g., the fixed document form overlaid with the print data. Then, the print data filing unit controls the information for determining which printing control information are used and which forms overlay definition data are used.

The printing control means prints out the print data by the printer according to the printing control information and prints out by overlaying the print data and the forms overlay definition data by the printer when forms overlay definition data to be overlaid are present.

The first converting means converts a command form for the printer to a form for display. The command form is for a hard control command defined to correspond to the print data. The second converting means converts coordinates of the print data to match the display according to the printing control information, taking the resolution of a display screen into consideration. The first converting means and second converting means execute the converting process at every page when the printing control information are changed at every page.

The third converting means converts the forms overlay definition data to match the display, taking the resolution of the display screen into consideration. The third converting means converts the forms overlay definition data to an image information form when the forms overlay definition data are represented by a graphic information form.

The print data memory stores the print data converted by the second converting means. The overlay memory stores the forms overlay definition data converted by the third converting means.

The display control means executes a display control process for the display screen. The modification means modifies an offset value defining a starting point of the print data or an offset value defining a starting point of the forms overlay definition data.

According to the present invention, the first converting means converts the command form for the printer to the form for the display. This command form for the printer is the hard control command which is defined to correspond to the print data.

The second converting means converts coordinates of the print data to match the display according to the printing control information, taking the resolution of the display screen into consideration, and then loads the print data into the print data memory.

The third converting means converts the forms overlay definition data to match the display, taking the resolution of the display screen of the display into consideration, and then loads the forms overlay definition data into the overlay memory.

After the print data converted to match the display are loaded into the print data memory, the display control means displays the print data on the display screen by sending out the print data loaded in the print data memory to the display with the hard command converted by the first converting means.

The print data displayed on the display screen are displayed in a display form the same as the print form of the printer because the print data are converted to match the display according to the print control information. Thereby, the user can recognize the print form of the print data on the display screen of the display and can set the print control information which can provide the desired print form.

In the case that the forms overlay definition data overlaid with the print data are present, the forms overlay definition data converted to match the display are loaded into the overlay memory. The display control means sends out the forms overlay definition data loaded into the overlay memory to the display. The display control means then displays the print data and the forms overlay definition data on the display screen by overlaying the print data with the forms overlay definition data.

The overlaid data displayed on the display screen are displayed in a display form the same as the print form of the printer because the print data are converted to match the display according to the print control information and the forms overlay definition data are converted to match with the resolution of the display screen. Thereby, the user can recognize the print form of the print data on the display screen and can set the print control information which can provide the desired print form.

In the case of the display control means displaying the print data and the forms overlay definition data on the display screen by overlaying the print data with the forms overlay definition data, the modification means modifies by receiving from the interactive unit of the display an offset value for defining a starting point of the print data or an offset value for defining a starting point of the forms overlay definition data so that a misregistration of the overlaid data is prevented.

Therefore, if the starting point of the print data has not been matched with the starting point of the forms overlay definition data, the misregistration is capable of being removed using the display screen of the display. The user can print out the print data and the forms overlay definition data by correctly overlaying the print data with the forms overlay definition data without trial printing.

DETAILED DESCRIPTION OF THE PREFERRED EMBODIMENTS

The present invention will now be described in detail referring to the drawings attached hereto.

Figure 1:
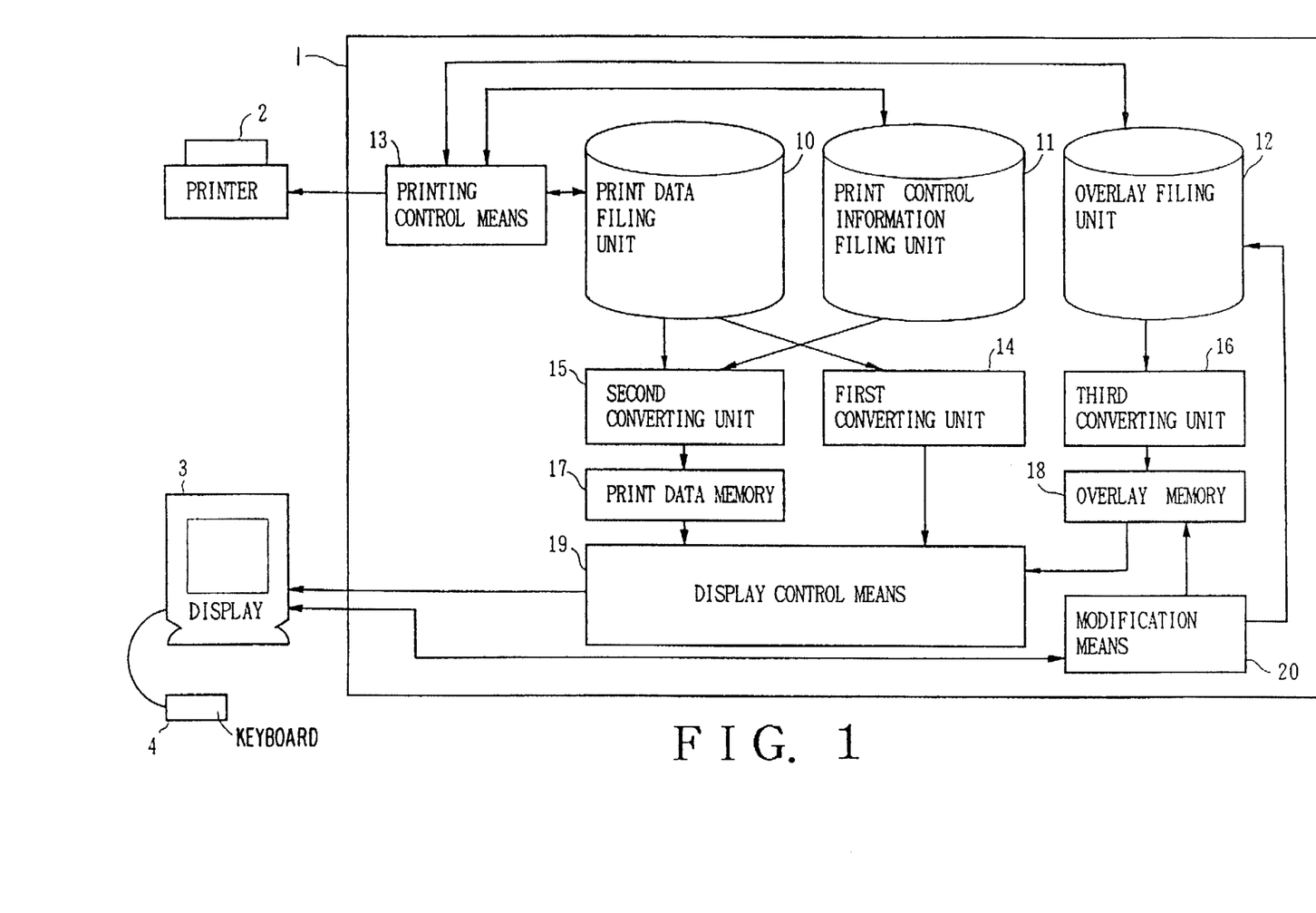
FIG. 1 is a principle view of a construction of the present invention.

FIG. 1 show a principle construction of the present invention.

A data processing device 1 for processing print data of the present invention is connected to a printer 2 and a display 3. Moreover, the display 3 is connected to an interactive unit 4 such as a keyboard.

The printer 2 prints out the data which is processed by the data processing device 1. The display 3 displays the data which is produced by the data processing device 1. And the interactive unit 4 receives input data from a user.

The data processing device 1 comprises a print data filing unit 10, printing control information filing unit 11, an overlay filing unit 12, printing control means 13, first converting means 14, second converting means 15, third converting means 16, a print data memory 17, an overlay memory 18, display control means 19, and modification means 20.

The print data filing unit 10 stores print data to be printed. The printing control information filing unit 11 stores printing control information designating a printing form of the print data. The overlay filing unit 12 controls forms overlay definition data overlaid with the print data. The forms overlay definition data is indicative of a fixed data part in a printed matter, such as a fixed document form, into which the printed data is inserted to generate a complete document form.

Then, the print data filing unit 10 controls the information for determining which printing control information are used and which forms overlay definition data are used.

The printing control means 13 sends the print data to the printer 2 according to the printing control information and causes the printer 2 to print out by overlaying the print data and the forms overlay definition data when forms overlay definition data to be overlaid are present.

The first converting means 14 converts a command form for the printer 2 to a form for display 3. The command form is for a hard control command defined to correspond to the print data. The second converting means 15 converts coordinates of the print data to match the display 3 according to the printing control information, taking the resolution of a display screen of the display 3 into consideration. The first converting means 14 and second converting means 15 execute the converting processes at every page when the printing control information are changed at every page.

The third converting means 16 converts the forms overlay definition data to match the display 3, taking the resolution of the display screen of the display 3 into consideration. The third converting means 16 converts the forms overlay definition data to an image information form when the forms overlay definition data are represented by a graphic information form. The print data memory 17 stores the print data converted by the second converting means 15. The overlay memory 18 stores the forms overlay definition data converted by the third converting means 16. The display control means 19 executes a display control process to the display screen of the display 3. The modification means 20 modifies an offset value defining a starting point of the forms overlay definition data.

Figure 2:
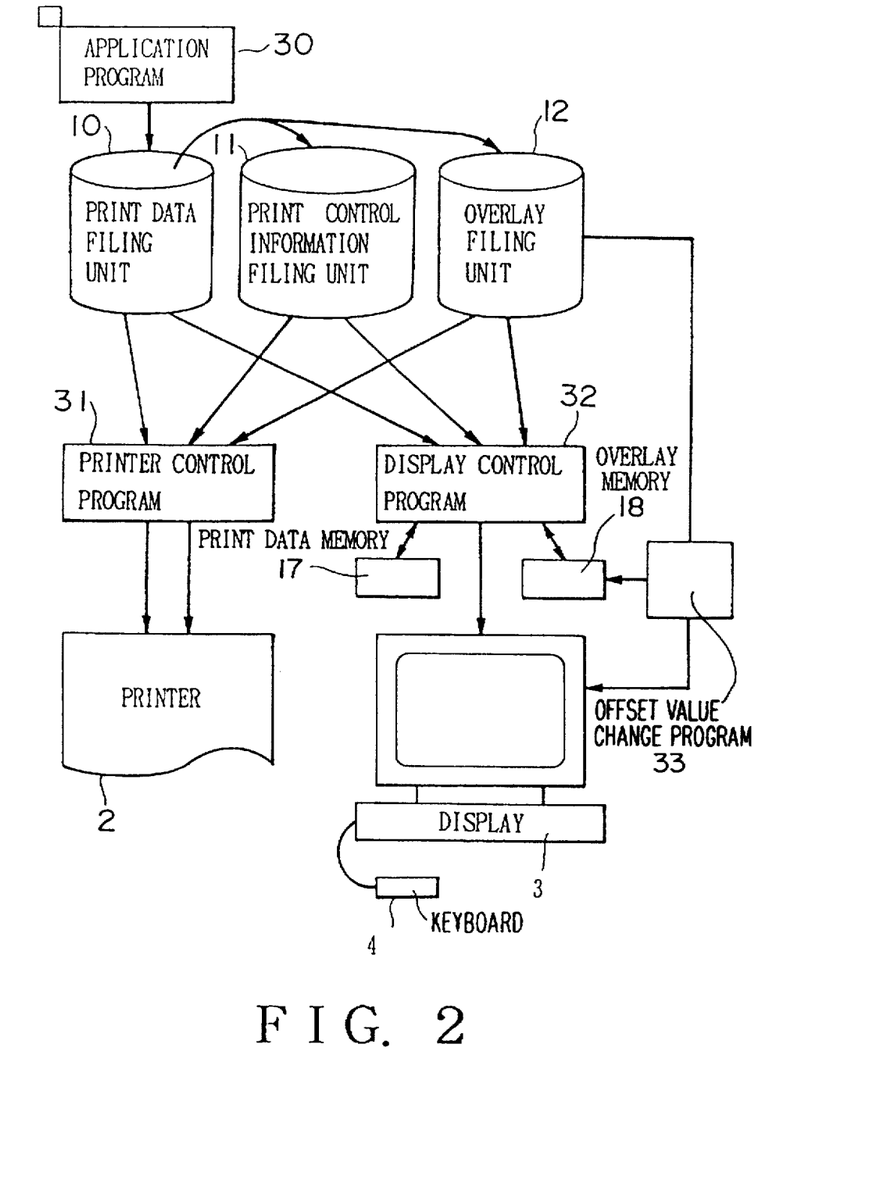
FIG. 2 is a view showing an example of the present invention.

FIG. 2 shows an embodiment according to the present invention. An application program 30 is loaded into the data processing device 1, and produces print data to be printed and which is then stored in the print data filing unit 10. A printer control program 31 is loaded into the data processing device 1, and controls the printer 2 so as to execute a printing process. A display control program 32 is loaded into the data processing device 1, and controls the display 3 so as to execute a displaying process. An offset value modification program 33 is loaded into the data processing device 1, and executes a modification process which modifies the offset value defining a starting point of the forms overlay definition data.

Before producing a printing command to be sent to the printer 2, the printer control program 31 downloads the printing control information stored in the printing control information filing unit 11, which is necessary for printing the print data, and the forms overlay definition data stored in the overlay filing unit 12 to the printer 2.

Figure 3:
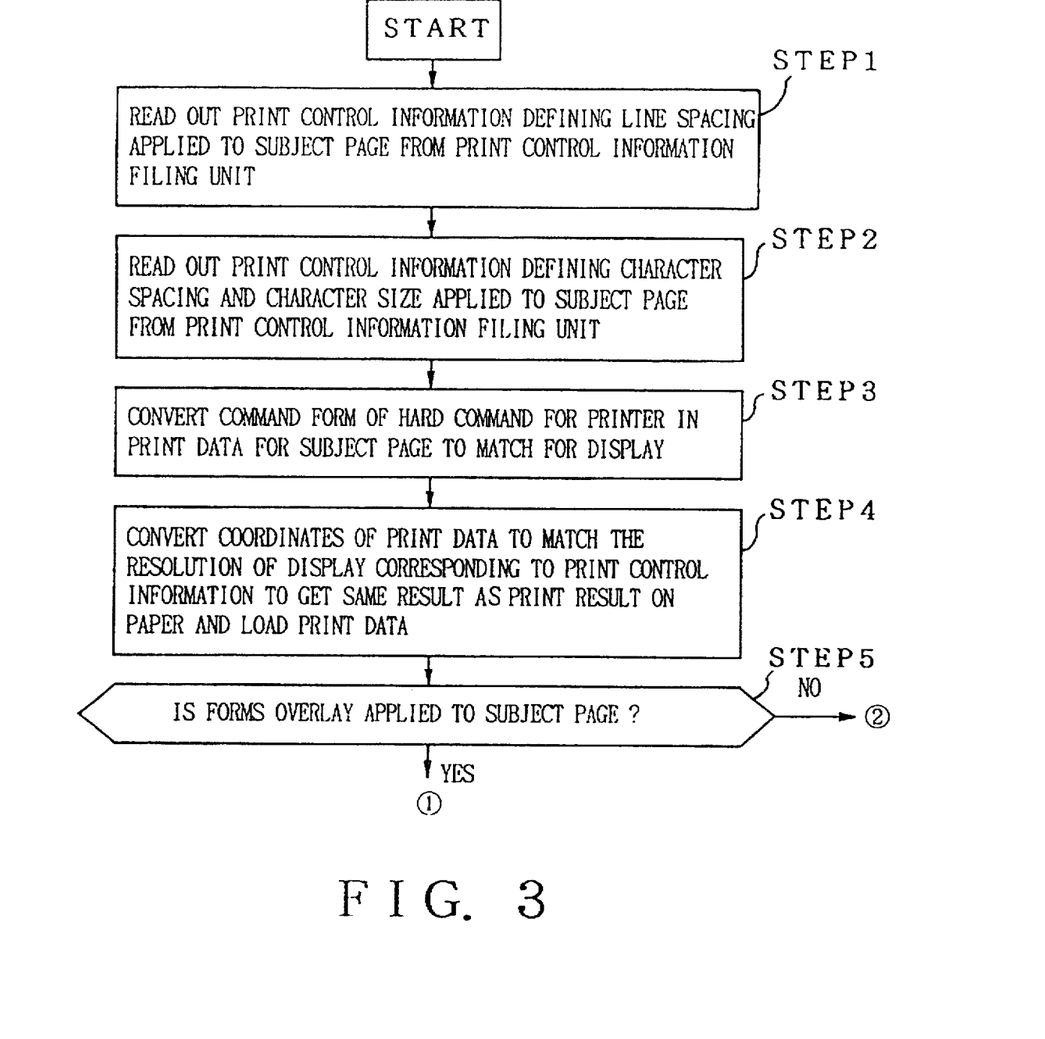
FIG. 3 is a view showing an example of process flow executed by a display control program.
Figure 4:
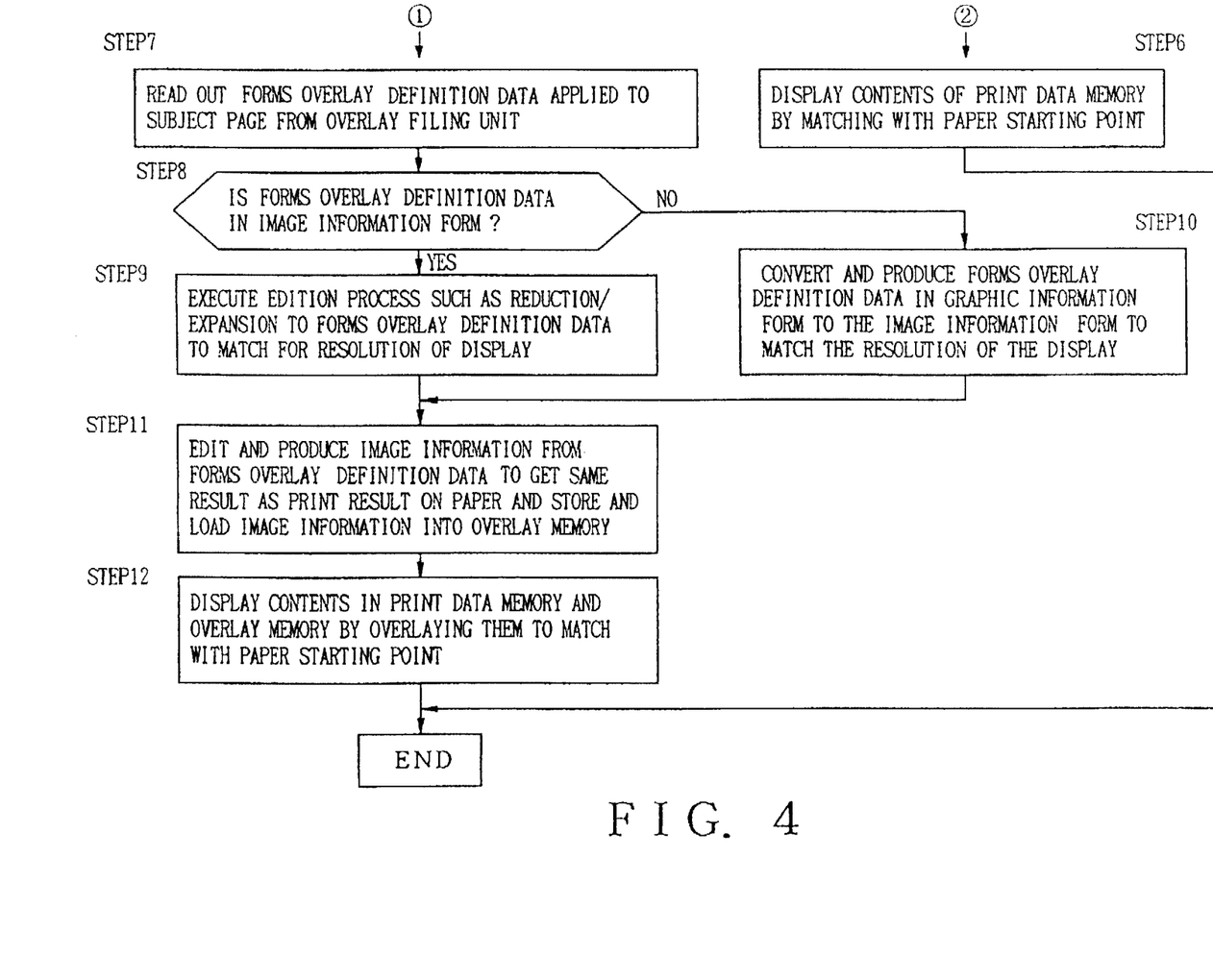
FIG. 4 is a flow chart showing further steps of the process flow executed by the display control program shown in FIG. 3.
Figure 5:
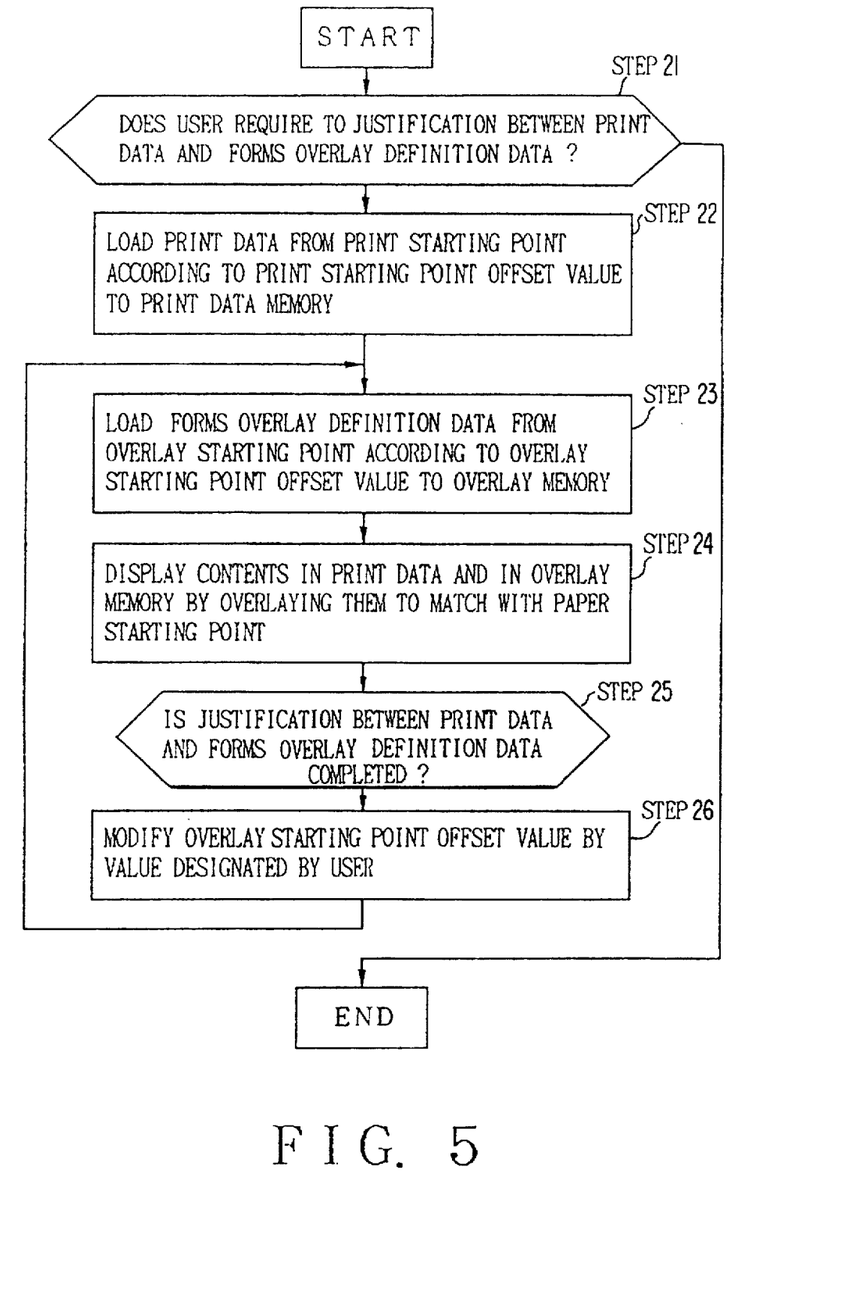
FIG. 5 is a flow chart showing an example of process flow executed by an offset value modification program.

FIG. 3 and FIG. 4 show a process flow executed by the display control program 32. FIG. 5 shows an example of a process flow executed by the offset value modification program 33. The present invention will now be described in detail according to these process flows. First, a description will now be made regarding a process executed by the display control program 32 in accordance with the process flows of FIG. 3 and FIG. 4.

First, the display control program 32 reads out the print control information defining the line spacing applied to a page commanded to be displayed in Step 1 as shown in the process flow of FIG. 3 after receiving a display command for displaying the print data from a user.

Next, the display control program 32 reads out the print control information defining the character spacing and character size applied to the page to be displayed in Step 2. If there are other print control information, the display control program 32 reads out this other information.

In Step 3, the command form of hard control command of the print data of the page to be displayed is converted from a form for the printer 2 to a form for the display 3. For example, the command form of the hard control commands such as a page-break command, a line-feed command, a line-skipping command, and a character-skipping command which depend on the hard commands are converted from forms for the printer 2 to forms for the display 3.

In Step 4, the print control information read out by Step 1 and Step 2 are referred to and the print data read out from the print data filing unit 10 are coordinate-converted to match the resolution of the display 3 to be stored and loaded in the print data memory 17.

In Step 4, the print data read out from the print data filing unit 10 are coordinate-converted to match the print data to the resolution of the display 3 by referring to the printing control information read out by Step 1 and Step 2 and are restored in the print data memory 17 so as to get a same result as the printing result on paper. When the resolution of the display 3 is 4 dots/inch, a relative position of the print data according to the printing control information is decided by thinning out structural lines of the print data or by other means to match to the resolution and is restored in the print data memory 17. The process for loading image data is not necessary to execute.

In Step 5, the display control program 32 determines whether or not the page to be displayed is a page to which forms overlay definition data is to be applied. In Step 5, when the display control program 32 determines that the page is not a page to which the forms overlay definition data is to be applied, the process proceeds to Step 6 of the process flow shown in FIG. 4. In Step 6, the print data loaded in the print data memory 17 is sent out to the display 3 so as to be displayed on the display screen of the display 3 in the display form which is the same as the print form on the paper.

In Step 5, when the display control program 32 determines that the page to be displayed is a page to which the forms overlay definition data is to be applied, the process proceeds to Step 7 of the process flow shown in FIG. 4. In Step 7, the forms overlay definition data applied to the page to be displayed is read out from the overlay filing unit 12. In Step 8, the display control program 32 determines whether the forms overlay definition data read out in Step 7 is in an image information form or in a graphic information form. That is, the display control program 32 determines whether or not the forms overlay definition data read out has been processed by an image loading.

In Step 8, when the display control program 32 determines that the forms overlay definition data is in the image information form, the procedure proceeds to Step 9. In Step 9, an edition process, such as reduction/expansion, is executed with the forms overlay definition data to match the resolution of the display 3. That is, the edition process, such as reduction/expansion, is executed with the forms overlay definition data to be fitted in the display screen of the display 3. When the display control program 32 determines that the forms overlay definition data is in the graphic information form (vector form), the process proceeds to Step 10. In Step 10, the form of the forms overlay definition data is processed by a converting/producing process for converting from the graphic information form to the image information form to match the resolution of the display 3. That is, the forms overlay definition data in the vector form is converted to a bit map form to be fitted in the display screen of the display 3.

In Step 11, the forms overlay definition data in the image information form produced in Step 9 or Step 10 is stored and loaded into the overlay memory 18. In the overlay memory 18, the forms overlay definition data which is the same as the printing result on paper is stored because the forms overlay definition data to be loaded is converted to get a same result as the print result on paper according to the procedure of Step 9 or Step 10.

In Step 12, the print data loaded in the print data memory 17 and the forms overlay definition data loaded in the overlay memory 18 are sent out to the display 3 so that overlaid data overlays the print data and the forms overlay definition data are displayed on the display screen of the display 3 in the display form the same as the printing form on paper. The hard control commands for the display 3 converted in Step 3 are sent out as the hard control commands of the print data. The overlaid data are displayed to match to the starting point.

The display control program 32 displays the print data on the display screen of the display 3 in correspondence with the display form designated by the print control information set for the printer 2 by executing the process flow of FIG. 3 and FIG. 4. In the case that the forms overlay definition data to be overlaid with the print data are present, the display control program 32 converts the forms overlay definition data for the printer 2 to the forms overlay definition data for the display 3. The display control program 32 then overlays the forms overlay definition data with the print data for display on the display screen of the display 3. Thereby, the print data/the forms overlay definition data are displayed in the display form the same as the print form on the printer 2. This display process is used for print data which have different print forms for each page because the display process is executed at every page.

A description will now be made regarding the process executed by the offset value modification program 33 according to a process flow shown in FIG. 5.

First, the offset value modification program 33 determines whether or not justification between the print data and the forms overlay definition data is required by the user in Step 21 as shown in FIG. 5. If the offset value modification program 33 determines that the justification is not required, the process ends.

Figure 6:
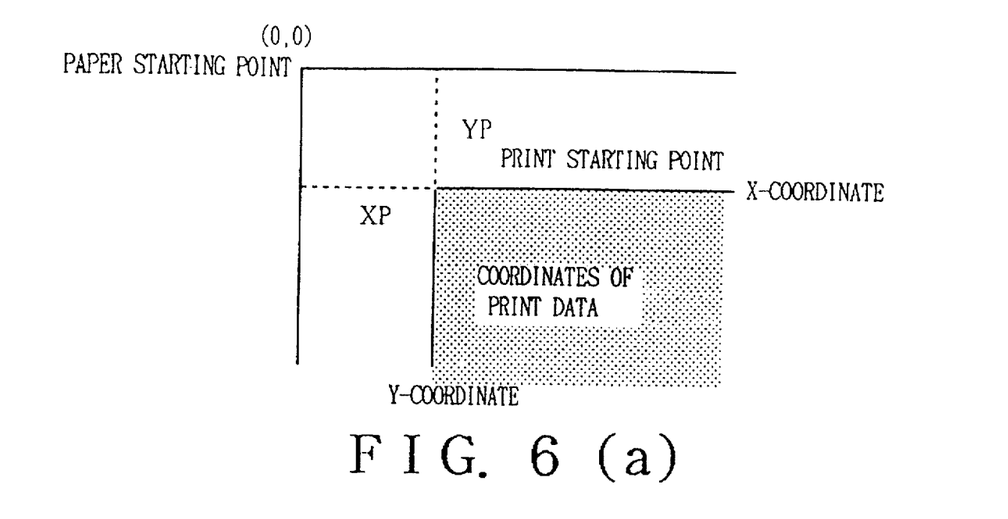
FIGS. 6(a) and 6(b) are views for use in describing a memory deployment.

If the offset value modification program 33 determines that the justification is required, the process proceeds to Step 22 to load the print data to be justified from a print starting point according to a print starting point offset value into the print data memory 17. That is, as shown in FIG. 6(a), the print starting point is provided so that the print data are loaded into the print data memory 17 based upon the print starting point as the criterion. The print starting point is defined as a position apart from a paper position by the print starting point offset value XP, YP. For understanding the present invention, the print data to be loaded into the print data memory 17 is converted to the print data for the display 3 according to the same process of the display control program 32 as mentioned above. When the print data of the print data memory 17 which is loaded by the display control program 32 are subjected to justification, this process is omitted.

In Step 23, the forms overlay definition data, to be overlaid with the print data which is to be justified, is loaded from the overlay starting point according to an overlay starting point offset value into the overlay memory 18. That is, as shown in FIG. 6(b), the overlay starting point is provided so that the forms overlay definition data is sent to the overlay memory 18 using the overlay starting point as the criterion. The overlay starting point is defined as a position apart from a paper position by the overlay starting point offset value XQ, YQ. For understanding the present invention, the forms overlay definition data to be loaded into the overlay memory 17 is converted to the forms overlay definition data for the display 3 according to the same process of the display control program 32, as mentioned above. When the forms overlay definition data of the overlay memory 18 which is loaded by the display control program 32 are subjected to justification, this process is omitted.

In Step 24, the print data to be loaded into the print data memory 17 and the forms overlay definition data to be loaded into the overlay memory 18 are sent out to the display 3 and, then, the print data and the forms overlay definition data are overlaid to be displayed on the display 3. This process is also capable of being omitted by the process of the display control program 32.

Because the print data and the forms overlay definition data overlaid and displayed in Step 24 are provided individually, the print starting point offset value XP, YP and the overlay starting point offset value XQ, YQ are not matched to each other. This causes a misregistration between the print data and the forms overlay definition data.

Figure 7:
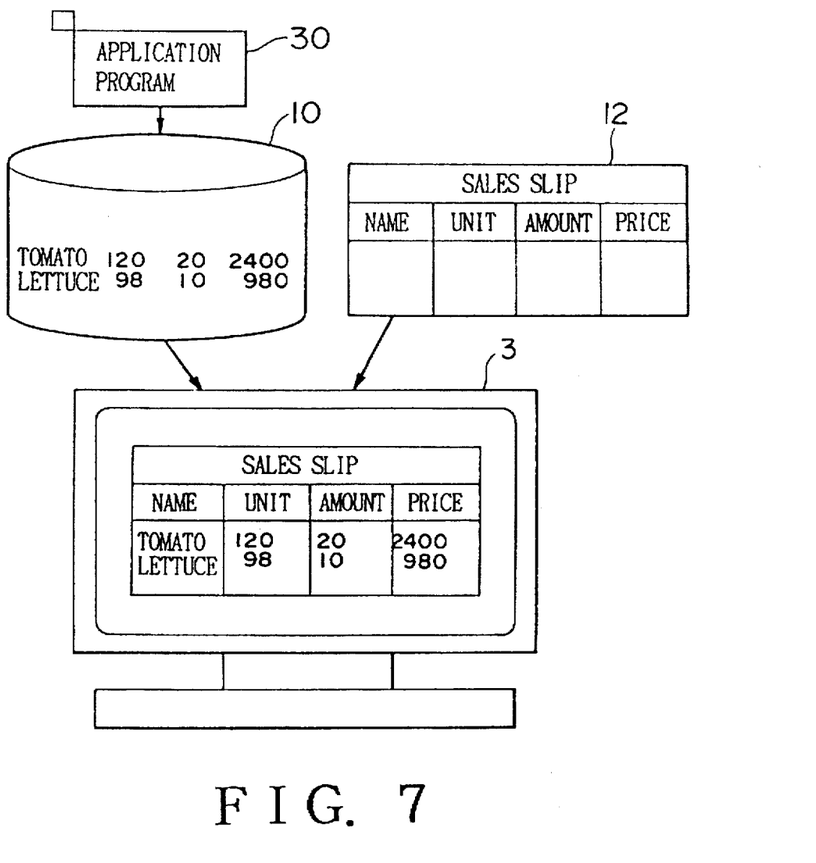
FIG. 7 is a view for use in describing a misregistration state.
Figure 8:
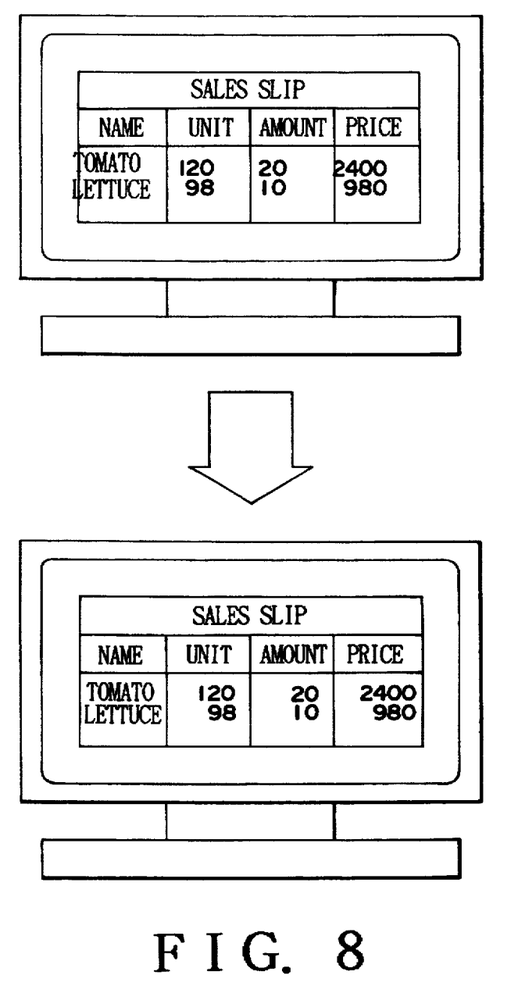
FIG. 8 is a view for use in describing a misregistration adjustment.

In Step 25, the offset value modification program 33 determines whether or not the justification between the print data and the forms overlay definition data is commanded to end by the user. If the offset value modification program 33 determines that the justification is commanded to end, the process ends. When the offset value modification program 33 determines that the justification is not commanded to end, the process proceeds to Step 26 to get a designation value from the user showing a modification quantity of the overlay starting point offset value. The offset value modification program 33 modifies the overlay starting point offset value according to the designation value and then returns to Step 23. Thereby, the display position of the forms overlay definition data is modified. FIG. 7 shows a view of the display 3 displaying print data generated from an application program and stored in the print data filing unit 10. The forms overlay definition data stored in overlay filing unit 10 is overlaid with the print data and is also displayed on the display 3. Misregistration is shown in the display 3 with the overlay of some of the vertical lines of the fixed document form and the printed data. By the process of modifying the overlay starting point offset value in Step 26, the misregistration between the print data and the forms overlay definition data can be eliminated, as shown in FIG. 8.

The modified overlay starting offset value reflects the forms overlay definition data stored in the overlay filing unit 12. Therefore, after this adjustment process, the overlaid data which the print data and the forms overlay definition data are overlaid are printed out without the misregistration.

Thus, the user can adjust the misregistration between the print data and the forms overlay definition data by interaction only with the display and without trial printing.

The preferred embodiment of the present invention has been described above, but it will be obvious that the present invention may be varied in many ways. For example, the embodiment has been described such that the forms overlay definition data represented in the graphic information form is converted into the forms overlay definition data represented in the image information form to be converted for the display 3 in Step 10 of the process flow in FIG. 4, but the forms overlay definition data represented in the graphic information form may be directly converted to the forms overlay definition data for the display 3. Further, the embodiment has been described such that the overlay starting point offset value is converted, but the print data starting point offset value, instead of the overlay starting point offset value, may be converted.

What is claimed is:

1. A data processing device for processing print data based on print information and forms overlay definition data which is to be overlaid on said print data, said data processing device comprising:

first converting a printer command form for the printer to match a display command form for the display, said printer command form being for a hard control command defined to correspond to said print data;

second converting means for converting coordinates of said printer to match coordinates of said print data for the display according to print control information corresponding to said print data;

a print data memory storing said print data from said second converting means;

an overlay filing unit storing forms overlay definition data for the printer, indicative of a fixed data part of a document form, to be overlaid on said print data;

third converting means for converting said forms overlay definition data for the printer to forms overlay definition data for the display, in dependence upon a resolution of the display;

an overlay memory storing said forms overlay definition data for the display; and display control means for sending out said print data loaded into said print data memory, the hard control command converted by said first converting means, and said forms overlay definition data for the display loaded into said overlay memory, for overlaying said print data with said forms overlay definition data to produce overlaid data, and for displaying said overlaid data on the display with said display command form according to said printer form.

2. The data processing device as claimed in claim 1, wherein said first, second, and third converting means execute the respective conversions at every page of said print data.

3. The data processing device for processing print data based on print information as claimed in claim 1, wherein said third converting means converts said forms overlay definition data for the printer to said forms overlay definition data for the display to match an image information form, when said forms overlay definition data for the printer is represented by a graphic information form.

4. The data processing device for processing print data based on print information as claim 1, further comprising;

modification means for modifying one of a first offset value for defining a starting point of said print data second offset value for defining a starting point of said forms overlay definition data for said the display so that a misregistration of said overlaid data displayed by said display on the display control mean is eliminated.

5. The data processing device for processing print data based on print information as claimed in claim 2, said data processing further comprising:

an overlay filing unit to store forms overlay definition data for the printer, indicative of a fixed data part of a document form, to be overlaid to said print data;

third converting means for converting said forms overlay definition data for the printer to forms overlay definition data for the display, in dependence upon a resolution of the display;

an overlay memory to store said forms overlay definition data for the display; and said display control means overlaying said print data loaded into said print data memory with said forms overlay definition data for the display loaded into said overlay memory to produce overlaid data, and displaying said overlaid data on the display.

6. The data processing device for processing print data based on print information as claimed in claim 3, further comprising:

modification means for modifying one of a first offset value for defining a starting point of said print data and a second offset value for defining a starting point of said forms overlay definition data for the display so that a misregistration of said overlaid data displayed by said display on the display control means is eliminated.

7. A method for processing print data based on print information and forms overlay definition data which is to be overlaid on said print data, comprising:

a first step of converting a printer command form for the printer to match a display command form for the display, said printer command form being for a hard control command defined to correspond to said print data;

a second step of converting coordinates of said print data for the printer to match coordinates of said print data for the display according to print control information corresponding to said print data;

a third step of storing said print data from said second step in a print data memory;

a fourth step of storing forms overlay definition data for the print in an overlay filing unit, indicative of a fixed data part of a document form, to be overlaid on said print data;

a fifth step of converting said forms overly definition data for the printer to forms overlay definition data for the display, in dependence upon a resolution of the display;

a sixth step of storing said forms overlay definition data for the display in an overlay memory; and a seventh step of sending out said print data loaded into said print data memory, the hard control command converted by said first step, and said forms overlay definition data for the display loaded into said overlay memory, for overlaying said print data with said forms overlay definition data to produce overlaid data, and for displaying said overlaid data on the display with said display command form according to said printer form.

* * * * *

UNITED STATES PATENT AND TRADEMARK OFFICE
CERTIFICATE OF CORRECTION

PATENT NO. : 5,802,259

DATED : September 1, 1998

INVENTOR(S) : Sugai

It is certified that error appears in the above-indentified patent and that said Letters Patent is hereby corrected as shown below:

Col. 9, [Claim 1], line 21, after "first" insert --converting-- means for--;

line 26, after "said" insert --print data for the--.

Signed and Sealed this

Ninth Day of February, 1999

Attest:

Attesting Officer

*Acting Commissioner of Patents and Trademarks*